United States Patent
Kleine et al.

[11] 3,735,518
[45] May 29, 1973

[54] FISHING LURE HAVING DETACHABLY POSITIONED HOOKS

[76] Inventors: Richard A. Kleine, 6017 Trenton Lane, Peoria, Ill. 61614; Stanley I. Meier, 821 Magdeline Drive, Madison, Wis.

[22] Filed: Mar. 19, 1971

[21] Appl. No.: 126,063

Related U.S. Application Data

[63] Continuation-in-part of Ser. No. 829,355, June 2, 1969, abandoned.

[52] U.S. Cl. ............43/42.04, 43/42.03, 43/42.15, 32/43
[51] Int. Cl. ............................................A01k 85/02
[58] Field of Search ....................43/42.05, 42.04, 43/42.03, 42.15, 42.28, 42.24, 42.26, 42.35, 42.36, 42.45

[56] References Cited

UNITED STATES PATENTS

| | | | |
|---|---|---|---|
| 2,189,958 | 2/1940 | Middlemiss | 43/42.04 |
| 681,308 | 8/1901 | Geen | 43/42.04 |
| 1,582,713 | 4/1926 | Welch | 43/42.15 X |
| 861,116 | 7/1907 | Heddon | 43/42.04 |
| 3,002,311 | 10/1961 | Kyper | 43/42.04 |
| 3,490,165 | 1/1970 | Thomassin | 43/42.24 X |
| 1,109,439 | 9/1914 | Maus | 43/42.15 |
| 1,485,643 | 3/1924 | Streich | 43/42.03 |
| 1,701,528 | 2/1929 | Clewell | 43/42.24 UX |
| 1,442,332 | 1/1923 | Frament | 43/42.15 |
| 857,593 | 6/1907 | Brown | 43/42.15 X |

FOREIGN PATENTS OR APPLICATIONS

| | | | |
|---|---|---|---|
| 1,112,113 | 11/1955 | France | 43/42.15 |
| 959,974 | 6/1964 | Great Britain | 43/42.39 |

*Primary Examiner*—Robert W. Michell
*Assistant Examiner*—John F. Pitrelli
*Attorney*—Hill, Sherman, Meroni, Gross & Simpson

[57] ABSTRACT

A fishing lure having a series of jointed segments formed about a thin flexible gauze material and having the gauze material extend outwardly of the individual segments to form fin and tail portions for the lure. The lure has a flexible wire extending axially thereof and against the flexible gauze material. The wire has a series of loop portions formed at intervals along the length thereof and extending outwardly of the body segments to form loop protrusions where hooks can be fastened to complete the lure. Variance in the motion of a fishing lure moving through the water as well as efficiencies of construction are effected by providing hook means attached to a lead ring at the head of the lure and detachably positioned along the body of the lure so that the hook means will remain in proximity to the life-like lure body to regulate the motion of the lure while it is being pulled through the water to attract the fish and may be disengaged from their position along the length of the body by the striking or fighting fish with the further results that the leverage given by the lure body to the striking fish in assisting it in rejecting the hook is eliminated while at the same time the fight of the striking fish against the hook may be removed from the area of the lure body. A slot means in a double hook allows detachably connecting the hook means in various positions on the lure so that movement characteristics of the fishing lure as it is pulled through the water may be varied.

31 Claims, 9 Drawing Figures

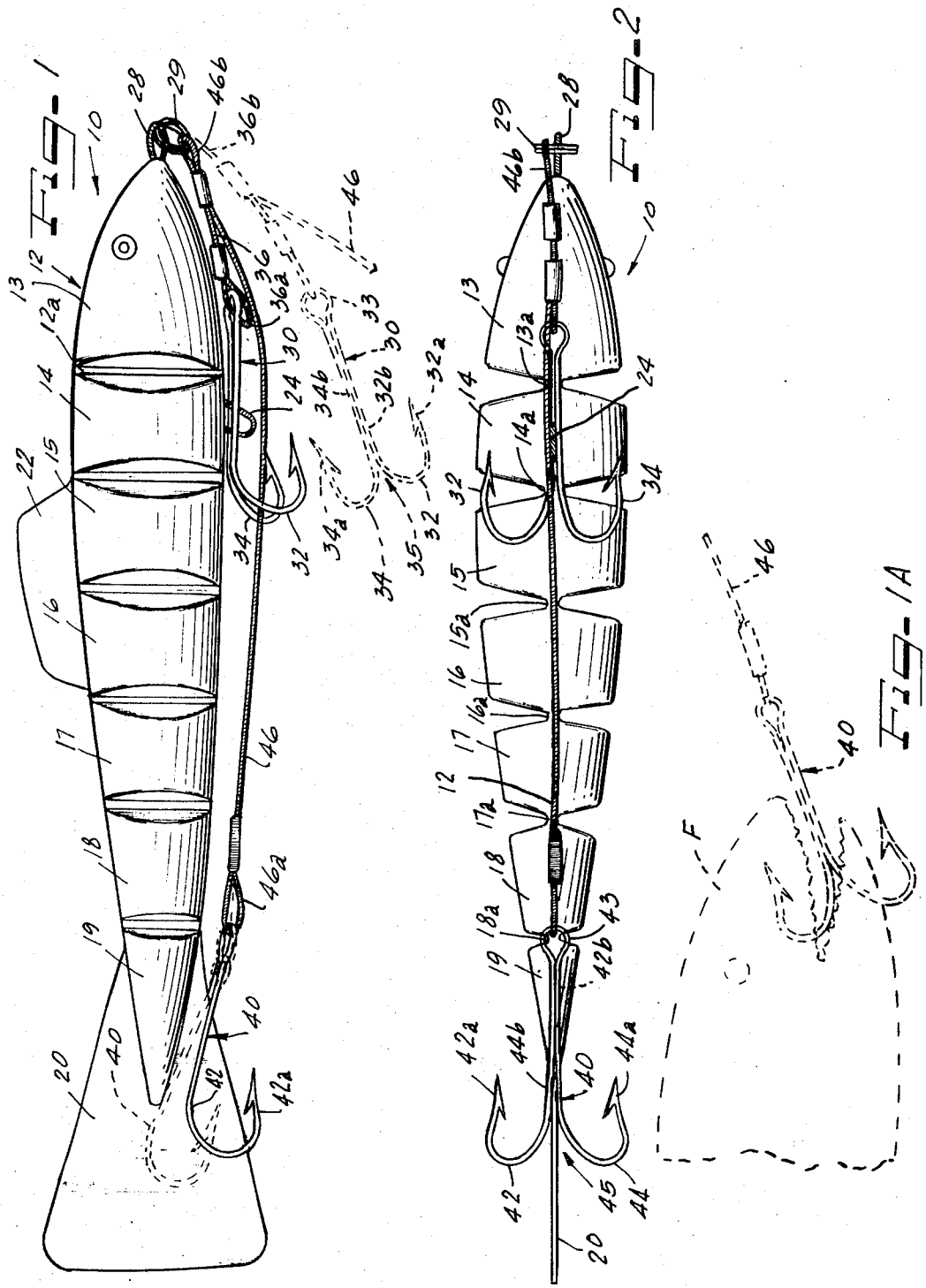

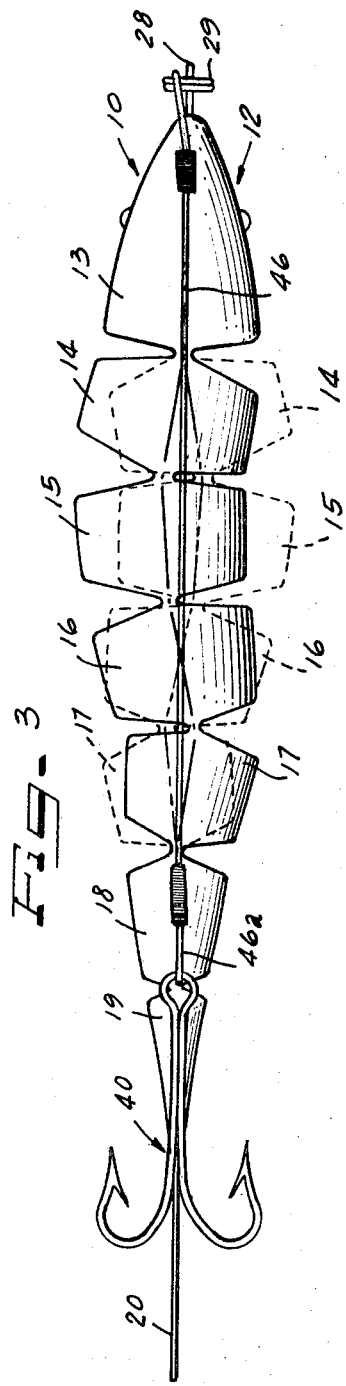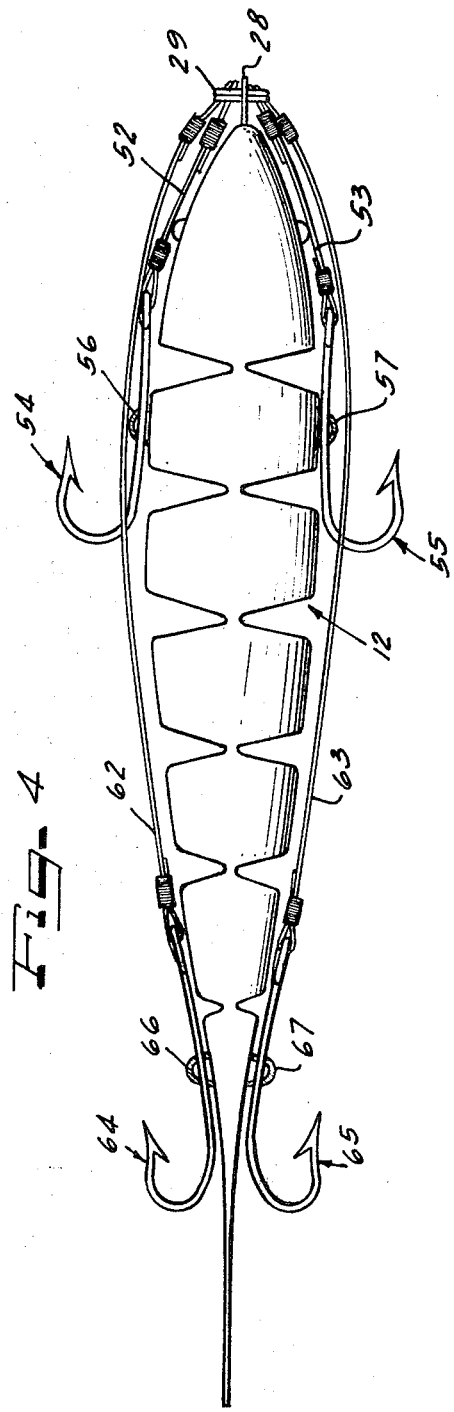

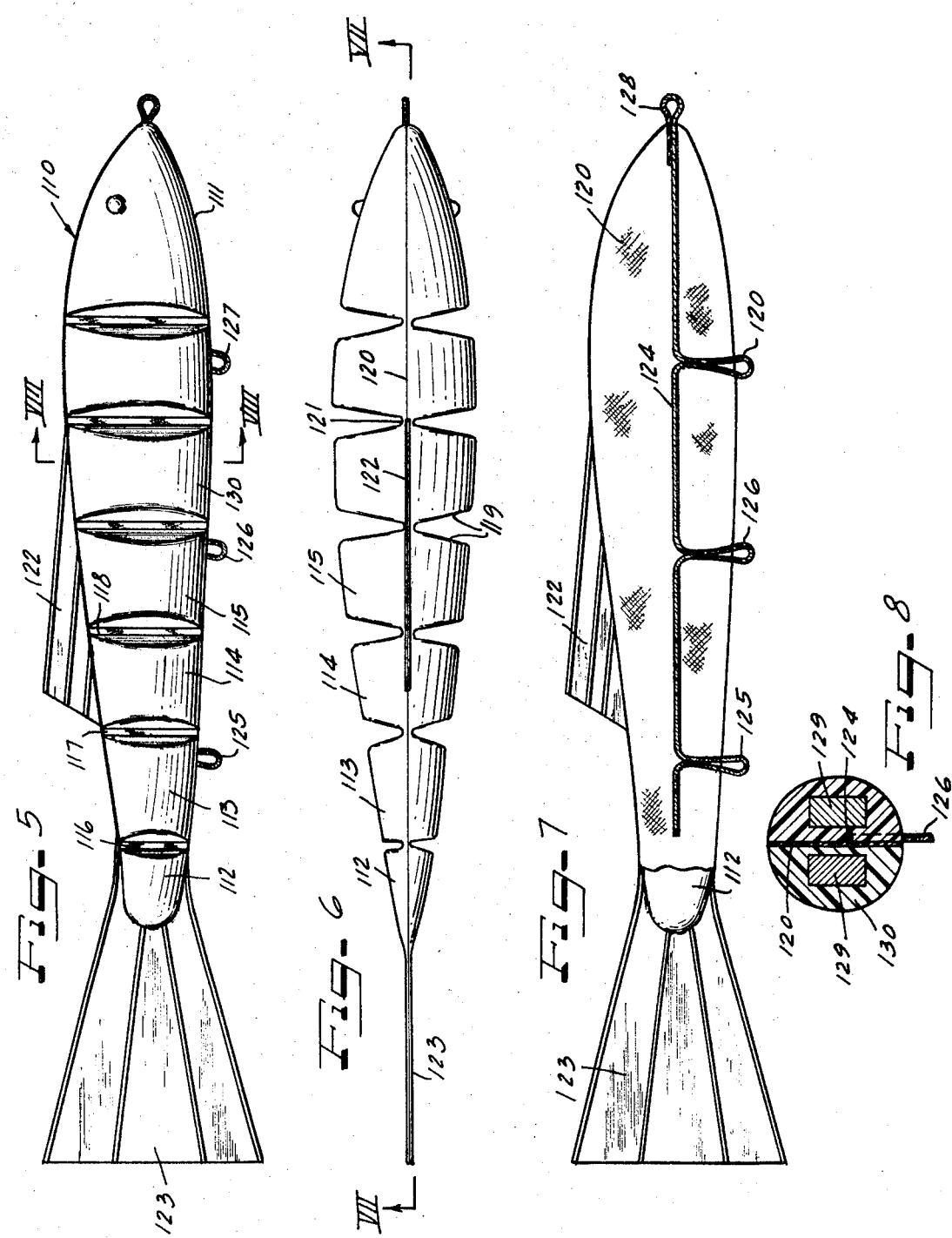

FISHING LURE HAVING DETACHABLY POSITIONED HOOKS

CROSS-REFERENCE TO RELATED APPLICATIONS

This is a continuation-in-part of our copending application Ser. No. 829,355, filed June 2, 1969, now abandoned.

BACKGROUND OF THE INVENTION

This invention generally relates to fishing lures and particularly concerns fishing lures having articulated bodies to simulate life-like fish movements when pulled through the water. More specifically, this invention relates to a fish lure formed integrally of a flexible soft plastic substance having a series of jointed body segments including tail and fin portions to simulate life-like motions. The invention also concerns the positioning and attachment of the lure hook to regulate its motion characteristics through the water, effect economies of construction and to minimize wear and tear on the lure body caused by the fighting fish.

SUMMARY OF THE INVENTION

As set forth in our co-pending U.S. applications Ser. Nos. 829,355 and 829,552 filed June 2, 1969 and directed to a fishing lure and method of manufacturing a fish lure, respectively, there are many advantages to a fishing lure formed of a flexible plastic-like substance with a series of jointed body segments formed about a thin flexible common rib material wherein the rib material which may be gauze-like extends outwardly of the individual body segments and is suitably coated with a flexible plastic-like material to form fin and tail portions. Thus, we have found that this lure is extremely effective in simulating the life-like motions of a bait fish when it is pulled through the water on the end of a fishing line. The articulated body segments flexing at a number of joints along a central common rib together with the fins and tail projecting from the common rib give the lure a very life-like movement.

To allow the flexibility between the articulated individual body segments and to give suitable flexibility to the fin and tail portions it is advantageous to construct them of a soft flexible plastic-like material and in practice we have found thermal plastics particularly suitable. While this flexible material makes possible the life-like motions which attract fish, in the past there has been no simple and efficient way to regulate the motion of the lure as it moves through the water except through exaggerated movements of the line. Flexibility of segments alone does not assure a particular motion. In addition, with some softer materials used to form the lure it is possible that the material may be susceptible to damage by the teeth of the fighting fish. This will be particularly true with such fighting game fish as fresh water muskies.

Accordingly, it is an object of this invention to provide an economical fish lure wherein the lure motion in the water may be readily regulated and which is less susceptible to damage by the fighting fish.

According to the preferred embodiments of our invention the lure has a fish hook means securely connected to the lure at a first point and detachably connected to the lure at a second point that is spaced from the first point. An attacking fish engaging the hook means will most likely detach the hook means from the second point of the lure but will be kept on the line by the connection of the hook means with the first point on the lure. The fish hook means includes at least one hook assembly each of which has a lead attached securely and pivotally connected to a ring at a forward first point of the lure and is detachably connected to the lure at a second point. The lure has an articulated body portion with appendages extending therefrom. A lead ring at a forward end of the lure provides a means of connection to a fishing line and as set forth herein may also provide the first point of connection for the fish hook means. The second point of detachable connection of fish hook means to the lure is an appendage extending from the body portion. As set forth herein the hook means may include one or more hook assemblies each comprising two or more hooks in juxtaposed relation and connected together to provide a slot structure resiliently biased to a closed position. Each of the hooks includes a hook portion and a shank portion with the shank portions being connected together at an end opposite from that to which the hook portion is attached to form a hook assembly with a slot between the shank areas. The hook portions may extend at angles to each other. Detachable connection between the fish hook means and the lure and particularly the lure body appendages is effected by the engagement of the appendages or a portion of the lure body by the resiliently biased slot of the hook means. The resilient engagement of the appendages or second point by the fish hook means will be such that the fish hook means will remain in position adjacent the lure body while being pulled through the water but may be detached from the second point upon engaging an attacking fish. The engagement pressure and location may be adjusted by a fisherman to suit his purposes.

Where the fishing lure may be of a length from three to twelve inches, for example, we have found it convenient to provide a pair of hook assemblies connected to the lead ring by a thin wire or chain and detachably secured along the lure body on suitable appendages. For a first hook assembly an appendage comprising a looped wire extending outwardly of the body has been found to be convenient for providing a second point detachable connection at a forward portion of the lure. Detachable connection of a second hook assembly at a rearward second point on the lure body has been found to be conveniently effected by engaging the slot means of the second hook assembly with the lower portion of the thin soft tail appendage.

With the two hook assembly construction the connection of the assemblies to the second detachable connection points is very convenient and may be quickly accomplished by even a novice fisherman. An important feature of this construction is that the lead lines from the hook assembly to the first forward point of construction of the lure are of a length to allow adjustment in the spacing of the hook assemblies along the length of the lure. Thus, with the long slot between the shanks of the hook assemblies the position may be adjusted along the length of the shank to vary the attitude and motion of the lure as it is pulled through the water. These factors are influenced by the shift in weight along the length of the lure, the tension of the hook assembly, and the change in resistance pressures on the lure by the way the hook means is attached to the lure appendage or appendages. As is true with a real fish, the tail and fins perform an important steering or rudder function. Thus, variation of the position of the hook assembly on the tail or fin varies its steering or rudder characteristics and likewise varies its motion characteristics which it exhibits while being pulled through the water.

According to the invention herein damage to the soft fish lure body is minimized by detachably connecting the fish hooks to the lure body so that a fish attacking the lure body and engaging the hook may detach the hook from its position along the body and thereby fight the hook a point removed from the lure body to minimize damage thereto. A further advantage is that the hooked fish must fight the hook along and cannot rely upon the leverage of the lure body to eject the hook. Moreover, the detachable connection of our hook means and its included hook assembly or assemblies is such that the movement characteristics which the lure exhibits when it is pulled through the water may be varied. Additional advantages of this advantageous fishing lure construction is that it makes easier removal of the hook assembly from the caught fish, it allows ready changing of hook sizes in anticipation of different game fish, allows ready replacement of the hook and/or the lure body and is also less expensive to manufacture and assemble.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is an elevational side view of the lure according to the invention;

FIG. 1A illustrates in dotted lines the position of the second hook assembly of FIG. 1 when it has been engaged in the mouth of an attacking fish;

FIG. 2 is a bottom view of FIG. 1 looking upwardly to show the hook assemblies in resiliently biased engagement with the lure;

FIG. 3 is a schematic representation of one line motion variance as a result of the hook being attached to the tail appendage;

FIG. 4 is a bottom view of an embodiment wherein the hook means are positioned along side the lure.

FIG. 5 is an elevational view of a fish lure according to the present invention showing the jointed body segments as formed integrally with a flexible web of gauze material and illustrating the orientation of fin and tail portions of the lure as formed about sections of the gauze material.

FIG. 6 is a top view of the lure of FIG. 5 showing the V-shaped profile which is formed between adjacent ones of the jointed body segments of the lure to control the flexure of the web of gauze material which extends axially along the length of the lure.

FIG. 7 is a sectional view taken along the lines III—III of FIG. 6 and showing the positioning of the gauze material and the wire having he hook loop portions formed at intervals along the length of the lure; and FIG. 8 is a sectional view of the lure of FIGS. 5 and 6 as taken along the lines IV—IV of FIG. 5 and showing the positioning of the gauze and wire materials within the soft flexible body portion of the lure.

DESCRIPTION OF THE PREFERRED EMBODIMENTS

Referring to FIG. 1 there may be seen a fish lure 10 according to the invention comprising an articulated body portion generally indicated at 12 having appendages 20, 22 and 24 extending therefrom with a fish hook means generally indicated by the first hook assembly 30 and second hook assembly 40 detachably engaging the lower forward appendage 24 and the fin rearward tail appendage 20.

The lure body 12 has a common rib 12a extending along the length of the lure with a series of jointed body portion segments 13 through 19 formed thereabout and extending therealong in adjacent articulated relation. The common rib 12a is formed of a flexible gauze-like material so that the jointed areas 13a (See FIG. 2) through 18a between the individual body segments 13 through 18 will allow easy movement of the segments in relation to one another. As illustrated in FIG. 2, the joints 13a through 18a are generally vertically disposed in relation to the horizontal disposition of the simulated fish lure so that lateral wiggling movement of the lure is possible as the lure is pulled through the water.

The common rib 12a may have integral portions thereof extending beyond the lure body segments to form a large tail fin 20 and a dorsal fin 22. While they are not shown it should be understood that the common rib may extend beyond the body to also form an anal fin and a pelvin fin. The appendage 24 may be of such thin material or, as it has been found advantageous, may comprise a loop of wire embedded in the body and extending therefrom for engagement by the detachable hook means. The appendages 20 and 22 will be of a soft, pliable material such as a gauze coated with suitable substance, as for example, thermoplastic material. The construction of the body portion and the appendages is set forth in greater detail in our above noted applications.

A nose loop 28 may extend from the nose of the lure to serve as a means for attachment of the fishing line and/or a lead line split ring 29. The loop 28 may be of wire embedded in the body and may or may not be connected with the wire loop appendage 24.

The loop 28 and/or the lead line split ring 29 serve as a first point to which the fish hook means may be securely connected to the lure and to the fish line to which the lure is attached. As shown, the fish hook means comprises a first hook assembly 30 including a wire 36 attaching a pair of hooks 32, 34 securely attached to the first point 28, 29. The hooks 32, 34 may each have a hook portion 32a, 34a connected to a shank portion 32b, 34b. The fish hooks 32, 34 have their shank portions 32b, 34b in juxtaposed spaced relation with a slot means 35 formed therebetween. The shank portions are connected together, as for example, by looped portion 33 so that the shank portions 32b, 34b are resiliently biased towards each other and preferably into engagement with each other so that the slot means 35 will extend along the length of the elongated shank portions when they are moved apart from each other. In FIG. 1 the hook assembly 30 is shown in full line in a side view in its attached position and is shown in dotted lines in its detached condition with the hook assembly 30 turned to about 90° to illustrate in greater detail the various portions thereof.

The second hook assembly 40 may be similarly constructed as the first hook assembly as will be readily understood by one skilled in the art referring to the similarly designated portions in FIG. 2. Thus, a lead wire 46 having a first end 46a attached to the hook assembly 40 and a second end 46b attached to the first point 28, 29 securely connects the hook assembly to the forward portion of the lure and to the fishing line. The wire 46 is flexible and its tension may be varied from the slack position as shown in solid lines in FIG. 1 to a taut position as shown for example in FIG. 3. A change in tension in the wire may be effected by simply moving the second hook means 40 from a position as shown in solid lines in FIG. 1 to a position as shown in dotted lines in FIG. 1. The first hook means 30 and any other hook means provided may be similarly varied in position with the net result being to vary the movement characteristics of the lure as it is pulled through the water. Thus, with the hook assembly 40 in a more rearward position as shown in dotted lines, on FIG. 1 the tail fin 20 will tend to have a different stiffness factor and a correspondingly different movement through the water. Further, as shown in FIG. 3, the more rearward position shown in FIG. 1 has the effect of shortening the effective length of the lure to thereby generate a lateral deviation in a middle portion of the lure which actually simulates a fish at the instant when a fish wiggles. The net result of providing this lateral deviation is to create a lure that will actively wiggle in the water while it is being dragged therethrough. Moreover, the flexing of the lure as indicated by the dotted lines in FIG. 3 will cause the lure to tend to move in a life-like varying path. As the hook structure is moved further to the rear the size of the lateral deviation will increase with correspondingly different movements of the lure through the water. These different movements will allow compensation for conditions of the type of fish sought, the visibility of the lure, etc.

The positioning of the hook assembly 40 on a tail appendage 20 is easily effected where the hook assembly 40 comprises a double hook having a slot 45 formed between the adjacent shank portions 42b, 44b of the hooks 42, 44. The separate hooks 42, 44 are connected in turn by loop portion 43 to which the first end 46a of the lead wire 46 may be easily and securely attached. The holding power of the double hook assembly 40 should be such as to allow the tail appendage 20 to be securely grasped to change the configuration of the lures as shown, for example, in FIG. 3, and, in addition it is desirable that the hook be removed upon the striking of a fish so that as illustrated in FIG. 1A, the fight of the fish may take place at a point removed from the bait. The length of a slot 45 formed between the adjacent shank portions 42b, 44b of the hooks 42, 44 connected by the looped portion 43 to form the hook assembly 40 is elongated so as to allow a maximum latitude of positioning on the fin 20 as indicated in FIG. 1 by the dotted lines.

FIG. 1A shows an attacking fish F hooked on the hook assembly 40 and it graphically illustrates the distance from the lure at which the fight of the attacking fish with the hook will take place. The disengagement of the hook from the tail 20 may occur when the attacking fish F engages it and/or when he attempts to disengage the hook means from his mouth. Where the body is formed of a soft material this remote fight of the attacking fish with the hook serves to minimize destruction of the lure. In addition it provides the advantage of minimizing the possibilities of the fish using the bait as a prying mechanism and shaking the hook. It is much more difficult for a fish to shake the hook when there is no bait involved directly in its mouth.

It is also contemplated that in addition to or instead of the hook means along the bottom of the bait as is suggested in FIG. 1, for example, hook means may be provided alongside the lure as suggested in FIG. 4. In this embodiment a first set of hook means 54, 55 are detachably positioned on opposite sides of the body 12 with respective lead lines 52, 53 connecting them to first point 28, 29 at which point the lure may be secured to a line. As was true of the previous embodiment, suitable appendages, here shown as wire at 56, 57 may be provided at a suitable point or points along the body 12 for detachable connection of the hook means as previously explained. The appendages 56, 57 may be in the form of wires such as illustrated at 24 or may take the form of a fin such as was shown at 22 or similar appendage. It will be understood that the fin form or wire appendages may be placed on the lure body wherever desired. A second set of hook assemblies 64, 65 may be secured to the forward end of the lure by lead wires 62, 63, respectively. Again, if the hook means 64, 65 may be held in detachable position by appendages or wires 66, 67, respectively in a manner as previously set forth with respect to the appendage 24 in FIG. 1. That is, the suitable projection or appendage will coact with the bifurcated portion of the hook to provide a support for the hook. With this construction if it is desired to put the lateral deviation into the lure as previously described the relative position of the hook assemblies 64, 65 on the projections 66, 67, respectively, may be easily altered to shorten the effective length of the lure thereby generating the lateral deviation. The side positioning of the hook also offers the advantage that the tensions on the lead line 62, 63 may be different on each side so as to keep the lure in a more fixed position.

The fish lure of the present invention is formed by molding a soft flexible thermoplastic-like substance about a web of gauze material which is disposed longitudinally of the lure. The thermoplastic substance advantageously has a hardness of A-10 durometer on a shore hardness scale.

The gauze material provides strength and flexibility for the lure, while the soft flexible body portions are capable of simulating life-like motions when being drawn through water. The lure of the present invention has a series of individual segment type body portions which are molded integrally with the gauze material and spaced apart along the length of the gauze to form series of jointed segments which are contoured into an elongated fish lure body.

The gauze material is not simply confined to the interior portions of the lure, but is allowed to extend out from the main body portion to form fins or tail portions for further simulating life-like actions as the lure is being manipulated. The lure is further strengthened by positioning a length of wire against the gauze during the molding operation. In addition, the length of wire is provided with loops formed at intervals along the body of the lure and extending outwardly from the lure body so that hooks may be attached beneath and adjacent to the surface of the lure.

Referring to the drawings in greater detail, a fish lure 110 is shown in FIG. 5 as having an elongated body portion 111. The elongated body portion 111 is formed by a series of individual segments 112, 113, 114 and 115, for instance, which are joined together at points 116, 117, and 118, for example.

The segments 112 through 115 and the remaining similar segments which comprise the entire lure may be formed of a soft plastic material which can be readily molded in the shapes shown in FIG. 5.

In FIG. 6 the profile of the individual segments 112, 113, 114 and 115 can be seen in detail. The segments have a V-shaped profile 119 formed between adjacent ones of the segments. This arrangement allows the lure to flex about a thin rib of material 120 about which the segments are formed.

The thin rib or web of material 120 may be formed of a gauze type material and may be of any suitable flexible material which can withstand repeated flexing without breakage.

The sectional view of the lure as shown in FIG. 7 illustrates the positioning of the gauze material 120 which forms the rib to join the individual segments 112 through 115 of the lure. The web or rib of gauze is placed into position in the mold during the forming process, and the flexible plastic substance is injected into the mold to encapsulate the web of material. Since the mold is so shaped as to form the V-shaped profiles 119, only a thin portion 121 of the gauze material remains. Accordingly the lure is highly flexible at points such as the point 121 longitudinally thereof.

The method of forming the lure may be understood in detail from my co-pending application entitled "Method of Manufacture of a Fish Lure," filed June 2, 1969, and identified as Ser. No. 829,552, now continuation-in-part application No. 126,064, filed of even date herewith.

When the web of material is placed in the mold, portions of the web are caused to overlie adjacent surfaces of the mold so that fin and tail portions such as the fin 122 and the tail portions 123 may be formed of gauze material. This allows the fin and tail portions to be more durable than if they were formed simply of a thin strip of thermoplastic material. Nevertheless, since the gauze material is highly flexible, the high degree of resiliency required of these parts of the lure is satisfied.

The mold may be provided with spaces in the vicinity of the fin and tail portions so that the soft flexible material, when injected into the mold, will form a film around the gauze material in the areas of the fin and tail portions. When the mold then cools, the fin and tail portions can be trimmed to any desired shape and size.

In addition to the use of the gauze material 120 between opposite halves of molds which are used to form the segmented body for the lure, a wire 124 is positioned longitudinally of the lure as shown in FIG. 13. The wire 124 adds strength to the lure without compromising the desired degree of flexibility. The wire 124 can be a stranded wire which has a high degree of flexibility and which can withstand repeated flexing without breaking.

The wire 124 may have a series of loops 125, 126 and 127 formed at intervals along the length thereof. Also, the wire 124 may have a loop 128 formed at the nose portion of the lure so that a line may be attached thereto. Hooks may be attached to the lure at the loops 125, 126 and 127 in a well understood manner.

It should be noted that the wire 124 extends outwardly from the body portion at the loop 128 and also extends outwardly of the body portion at the series of hook loops 125, 126 and 127.

While the soft flexible material which forms the segments of the lure 110 may be sufficiently buoyant, additional low density material may be embedded within the segments such as pieces of cork 129. By embedding pieces of cork 129 within the various segments, the ability of the lure to float can be controlled. Additional pieces of cork will increase the ability of the lure to float.

The cross sectional view shown in FIG. 8 illustrates the positioning of the gauze material 120 within a body segment such as the segment 130. FIG. 8 also shows the adjacent positioning of the wire 124 and the manner in which the loops such as the loop 126 extends below the main body portion of the lure.

The individual segments which form the lure may be shaped to any desired configuration, and the lure may be made more life-like by the addition of coloring to the body segments and the like.

Accordingly, the present invention provides an improved fish lure which has a body portion formed of jointed segments. The jointed segments are formed integrally with a web of a gauze material to provide strength and increased flexibility for the lure. The web of material is used to extend into areas where fins and tail portions of the lure are desired, and these portions may be formed directly from the gauze by trimming after the mold has cooled. Also, the use of the gauze assists in strengthening the lure in the vicinity of a wire which is extended along the axis of the lure and which has loop portions for receiving hooks. Furthermore, the float characteristics of the lure can be controlled by adding buoyant substances to the body segments during the molding process.

From the above-noted description of the preferred embodiment it may be understood that we have disclosed a fishing lure formed of a flexible plastic-like substance having an articulated body and fish hook means adjacent thereto securely connected to the lure at a first point and detachably connected to the lure at a second point at a spaced distance from the first point with the advantages that the configuration of the lure and hence its motion through the water may be varied. In addition this construction minimizes damage to the lure by a striking fish because the hook means may detach from the lure to leave the attacking fish to fight with the hook at a point remote from the lure body. Also, with the hooks positioned on the side of the lure, the detachable connection of the hook means to the tail and other appendages may be different to change the movement characteristics of the bait. Further this invention has the advantages that the separated portions may be individually replaceable when worn; that the size of the fish hooks may be varied and changed according to the type of fish sought; that the number and positioning of the hooks on the bait may be readily varied; and that the lure is less expensive to manufacture and assemble.

While we have disclosed a preferred embodiment of our invention it must be understood that we intend to include herein all variations obvious to one of ordinary skill in the art. Thus, the size and coloring of the lure may be varied. Also, the materials may be varied within the parameters set forth herein. The present embodiments are therefore to be considered in all respects as illustrative and not restrictive, the scope of the invention being indicated by the appended claims rather than by the foregoing description, and all changes which come within the meaning and range and purview of equivalency of the claims are therefore intended to be embraced therein.

We claim:

1. A flexible fishing lure including fishhook means securely connected to said lure at a forward point and detachably connected to said lure at any one of a plurality of rearward positions spaced from said forward point whereby the variation in connection at the rearward position varies the movement characteristics of the lure as it is moved through the water, said lure has a body portion having a forward end and a rearward end with said body portion being flexible between said ends, said forward point being located at a forward end of said lure and said rearward position being adjacent said body and spaced rearwardly of said forward end.

2. A fishing lure according to claim 1 wherein said forward point comprises a lead loop.

3. A fishing lure according to claim 2 wherein at least some of said positions occur on an appendage extending from said body portion and said hook means resiliently grips said appendage at said various positions thereon to form a detachable connection therewith.

4. A fishing lure according to claim 3 wherein said hook means includes a hook assembly of at lest two hooks, each of said hooks having a hook portion and a shank portion, said shank portions being resiliently connected together at one end and forming a slot means therebetween said shank portions being resiliently biased towards each other to create a resilient gripping means for detachably connecting said hook means along said lure.

5. A fishing lure according to claim 3 wherein said hook means includes a first and second hook assembly spaced along said body, said first hook assembly being detachably connected to a first appendage near the forward portion of said lure, and said second hook assembly being detachably connected to a second appendage near the rear of said lure.

6. A fishing lure according to claim 5 wherein said first appendage is a wire means extending from said lure body and said second appendage is a thin flexible tail portion.

7. An elongated fishing lure including a flexible body portion and fishhook means, said fishhook means being secured with said lure at a first point disposed generally at a forward end of said body and detachably connected to said body at a second point thereof, with the body being flexible between said ends, said second point being spaced from said first point and adjacent to said lure, said fishhook means including at least one hook assembly, each hook assembly having a lead wire therefrom connected to said first point whereby an attacking fish engaging said hook assembly may detach the said hook assembly from said second point of said lure and thereby fight said hook at a point remote from said lure.

8. A fishing lure according to claim 7 wherein said hook means includes a first and second hook assembly, each said hook assembly having a detachable connection means, said detachable connection means being each detachably engaged with a said second point, said second points each being an appendage from said lure body, said first hook assembly engaging a second point appendage near said forward end of said lure body, and said second hook assembly engaging a second point appendage near the rear of said lure body.

9. A fishing lure according to claim 7 wherein said second point is an appendage, said fish hook means each having a detachable connection means to allow variation in position of engagement of said connection means with said appendage.

10. A fishing lure according to claim 9 wherein said detachable connection means is a slot means elongated to allow variations in the position of said hook means on said appendage.

11. A fishing lure comprising an elongated body member, said body member having at least one appendage thereon, a hook means securely connected with a forward end of said lure and releasably connected to at least one of said appendages, said hook means having a detachable connection means to allow variation in position of engagement of said connection means with said appendage, said body member is articulated, said body member having a forward portion and a rearward portion, said rearward portion having a tail appendage thereon, said hook means being detachably connected to said rearward tail appendages said hook means being capable of being positioned at various positions on said tail appendage whereby said different positions of said hook means serve to vary the effective length of said lure as well as the rudder characteristics of said tail appendage and thereby vary the movement characteristics of the lure as it is pulled through the water, said detachable connection allowing the hook to be released upon engagement with an attacking fish so that the fight of the fish occurs at a point removed from the body member whereby damage to the body member is prevented and the attacking fish may not use the body member as an aid to ejecting the lure from its mouth.

12. A fishing lure according to claim 11 wherein said hook means are mounted on opposite sides of said lure by means of said detachable connection means.

13. A fishing lure according to claim 12 wherein said hook means includes a plurality of hooks positioned along side said body member and held by said detachable connection means, said hook means including at least first and second sets of hooks, each of said sets of hooks including pairs of hooks positioned on opposite sides of said body member.

14. A fishing lure adapted to simulate life-like movements when pulled through water comprising a body formed of a flexibly plastic-like material, said body having a flexible common rib extending longitudinally thereof said body comprising a series of individual segment portions which are fixed integrally with said common rib and spaced apart along the length of said rib to form a series of jointed segments which are contoured into an elongated fish body configuration, said jointed segments being capable of flexing in relation to each other, said common rib having portions extending out from the main body portion to form appendaged fin and tail portions for further simulating life-like actions as the lure is pulled through the water, and means for attaching hooks to said lure extending from said lure body, said fin and tail portions being coated with a flexible plastic-like material.

15. A fishing lure in accordance with claim 14 wherein said common rib is formed of a non-metallic flexible gauze.

16. A fishing lure in accordance with claim 14, wherein said lure body has pieces of material therein having a density which is substantially lower than the density of the material forming the lure body.

17. A fishing lure in accordance with claim 16 wherein said pieces of material are formed of cork.

18. A fishing lure in accordance with claim 14, wherein the web of material extending beyond the edge of the lure body is embedded in the same flexible material forming the individual segments.

19. A fishing lure in accordance with claim 14, wherein the individual segments are spaced apart longitudinally along the web and wherein a V-shaped profile is formed between adjacent segments to control the flexure of the web material.

20. A fishing lure in accordance with claim 14, wherein said fishing lure has a flexible wire extending along a portion of the length of said lure adjacent to said common rib, said wire being formed to have loops therealong, and a portion of said loops extending beyond said fish body.

21. A fishing lure according to claim 20, wherein said wire has a closed loop on a forward end thereof, said closed loop having a portion thereof exposed and adapted to receive a connection with a fishing line.

22. A fishing lure comprising a lure body formed of a thermoplastic-like substance, said lure body having a common rib extending longitudinally thereof, a plurality of jointed segments formed along the length of said lure body and firmly secured to said common rib, said common rib being flexible and said jointed segments being spaced along said common rib so as to allow flexure freedom for said rib, said common rib extending along the length of said lure body and being formed integrally with said plurality of jointed segments, means extending from said lure body to receive hooks therefrom, said common rib extending outwardly from said lure body to form flexible appendages thereof, said appendages being coated with said thermoplastic substance and thereby forming fins.

23. A fishing lure in accordance with claim 22, wherein said common rib is formed of a non-metallic flexible gauze.

24. The fishing lure of claim 22 further characterized by fishhook means being mounted on said lure body, said fishhook means being secured with said lure body at a first point disposed generally at a forward end of said body and detachably connected to said body at a second point thereof, said second point being spaced from said first point and adjacent to said lure body, said fishhook means including at least one hook assembly, each hook assembly having a lead wire therefrom connected to said first point whereby an attacking fish engaging said hook assembly may detach the said hook assembly from said second point of said lure and thereby fight said hook at a point remote from said lure body.

25. A fishing lure according to claim 24 wherein said hook means includes a first and second hook assembly, each said hook assembly having a detachable connection means, said detachable connection means being each detachably engaged with a said second point, said second points each being an appendage from said lure body, said first hook assembly engaging a second point appendage near said forward end of said lure body, and said second hook assembly engaging a second point appendage near the rear of said lure body.

26. A fishing lure according to claim 24 wherein said second point is an appendage, said fishhook means each having a detachable connection means to allow variation in position of engagement of said connection means with said appendage.

27. A fishing lure according to claim 26 wherein said detachable connection means is a slot means elongated to allow variations in the position of said hook means on said appendage.

28. A fishing lure according to claim 22 where the body member has at least one appendage thereon spaced rearwardly of a forward end, hook means securely connected with a forward end of said lure and releasably connected to at least one of said appendages, said hook means having a detachable connection means to allow variation in position of engagement of said connection means with said appendage.

29. A fishing lure according to claim 28, wherein said body member is articulated, said body member having a forward portion and a rearward portion, said rearward portion having a tail appendage thereon, said hook means being detachably connected to said rearward tail appendage, said hook means being capable of being positioned at various positions on said tail appendage whereby said different positions of said hook means serve to vary the effective length of said lure as well as the rudder characteristics of said tail appendage and thereby vary the movement characteristics of the lure as it is pulled through the water, said detachable connection allowing the hook to be released upon engagement with an attacking fish so that the fight of the fish occurs at a point removed from the body member whereby damage to the body member is prevented and the attacking fish may not use the body member as an aid to ejecting the lure from its mouth.

30. A fishing lure according to claim 28 wherein said hook means are mounted on opposite sides of said lure by means of said detachable connection means.

31. A fishing lure according to claim 30 wherein said hook means includes a plurality of hooks positioned alongside said body member and held by said detachable connection means, said hook means including at least first and second sets of hooks, each of said sets of hooks including pairs of hooks positioned on opposite sides of said body member.

* * * * *